(12) United States Patent
Lin

(10) Patent No.: US 7,007,776 B1
(45) Date of Patent: Mar. 7, 2006

(54) BICYCLE DISK BRAKE DEVICE

(76) Inventor: Ah-Ping Lin, No. 4-5, Shih-Pei Chuang, Shih-Pei Li, Changhua City (TW)

( * ) Notice: Subject to any disclaimer, the term of this patent is extended or adjusted under 35 U.S.C. 154(b) by 0 days.

(21) Appl. No.: 11/049,984

(22) Filed: Feb. 4, 2005

(51) Int. Cl.
*B62L 3/00* (2006.01)
(52) U.S. Cl. ...................... 188/24.22; 188/26
(58) Field of Classification Search ................. 188/26, 188/24.14, 24.15, 24.19, 24.22; 411/537
See application file for complete search history.

(56) References Cited

U.S. PATENT DOCUMENTS

| | | | | |
|---|---|---|---|---|
| 6,230,849 B1 * | 5/2001 | Lumpkin | ................. | 188/24.12 |
| 6,340,074 B1 * | 1/2002 | Lumpkin et al. | ............. | 188/26 |
| 6,425,464 B1 * | 7/2002 | Lumpkin et al. | ........ | 188/24.12 |
| 6,431,327 B1 * | 8/2002 | Lumpkin | ................. | 188/24.12 |
| 6,439,077 B1 * | 8/2002 | Lumpkin et al. | .......... | 74/502.4 |
| 6,491,137 B1 * | 12/2002 | Lumpkin et al. | ........ | 188/24.15 |
| 6,520,297 B1 * | 2/2003 | Lumpkin et al. | ............. | 188/26 |

* cited by examiner

*Primary Examiner*—Robert A. Siconolfi
*Assistant Examiner*—Devon Kramer
(74) *Attorney, Agent, or Firm*—Banner & Witcoff, Ltd.

(57) ABSTRACT

A bicycle disk brake device includes an anchored member secured to a bicycle frame and having a coupling wall, a caliper having two brake linings mounted thereon and a compliant wall compliantly mated with the coupling wall, and a brake disk secured to the bicycle frame and spaced apart from the linings. A tightening member is disposed to displace the compliant wall from a slightly loosened position, where the compliant wall is permitted to angularly displace relative to the coupling wall so as to adjust a position of the linings relative to the disk, to a tightened position, where the compliant wall is prevented from moving relative to the coupling wall. Due to the compliant mating of the coupling and compliant walls, the position of the linings can be adjusted conveniently and precisely.

3 Claims, 5 Drawing Sheets

BICYCLE DISK BRAKE DEVICE

BACKGROUND OF THE INVENTION

1. Field of the Invention

This invention relates to a bicycle disk brake device, more particularly to a bicycle disk brake device with a caliper for mounting brake linings the position of which relative to a brake disk can be adjusted.

2. Description of the Related Art

Referring to FIG. 1, a conventional bicycle disk brake device 1 is shown to include a brake disk 11 secured to a bicycle fork 2 and coaxial with a bicycle wheel (not shown), a caliper 12 secured to a side of the fork 2 by means of screw bolts 14 and pads 13, and having a slot 121 for receiving apart of the brake disk 11, and two brake linings 122 mounted on the caliper 12 at two opposite wall surfaces of the brake disk 11 so as to contact the brake disk 11 during a braking action. In order to place the brake disk 11 at a central position between the brake linings 122, the number of the pads 13 can be varied to adjust the position and inclination of the caliper 12 relative to the fork 2 so as to adjust the position of the brake linings 122 relative to the brake disk 11. However, the caliper 12 has to be detached from the fork 2 to permit mounting or removal of the pads 13 to or from the screw bolts 14, thereby resulting in inconvenience during adjustment. Besides, the range of adjustment is limited due to a predetermined thickness of each of the pads 13 so that a precise adjustment of the caliper 12 is difficult to conduct.

SUMMARY OF THE INVENTION

The object of the present invention is to provide a bicycle disk brake device which permits convenient and precise adjustment of the position of brake linings to maintain appropriate clearances between the brake linings and a brake disk.

According to this invention, the bicycle disk brake device includes a brake disk which is adapted to be mounted to a bicycle frame to be coaxial with a bicycle wheel in a longitudinal direction, and which has left and right wall surfaces opposite to each other in the longitudinal direction. An anchored member is adapted to be mounted to the bicycle frame, and is spaced apart from one of the left and right wall surfaces in the longitudinal direction. The anchored member extends in a transverse direction relative to the longitudinal direction, and terminates at a coupling wall that faces forward in the transverse direction. A caliper includes a base which defines a centerline normal to the base and oriented in the longitudinal direction, two brake linings which are mounted on the base and which are spaced apart from the left and right wall surfaces, respectively, by predetermined clearances, and an arm which extends from the base in a radial direction relative to the centerline to terminate at an arm end. A joint is connected to the arm end and has a compliant wall which is configured to be compliantly mated with the coupling wall such that, in a slightly loosened position, the compliant wall is permitted to angularly displace relative to the coupling wall so as to adjust a position of the brake linings relative to the brake disk, thereby maintaining the predetermined clearances, and in a tightened position, the compliant wall is prevented from moving relative to the coupling wall. A tightening member is disposed to displace the compliant wall from the slightly loosened position to the tightened position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
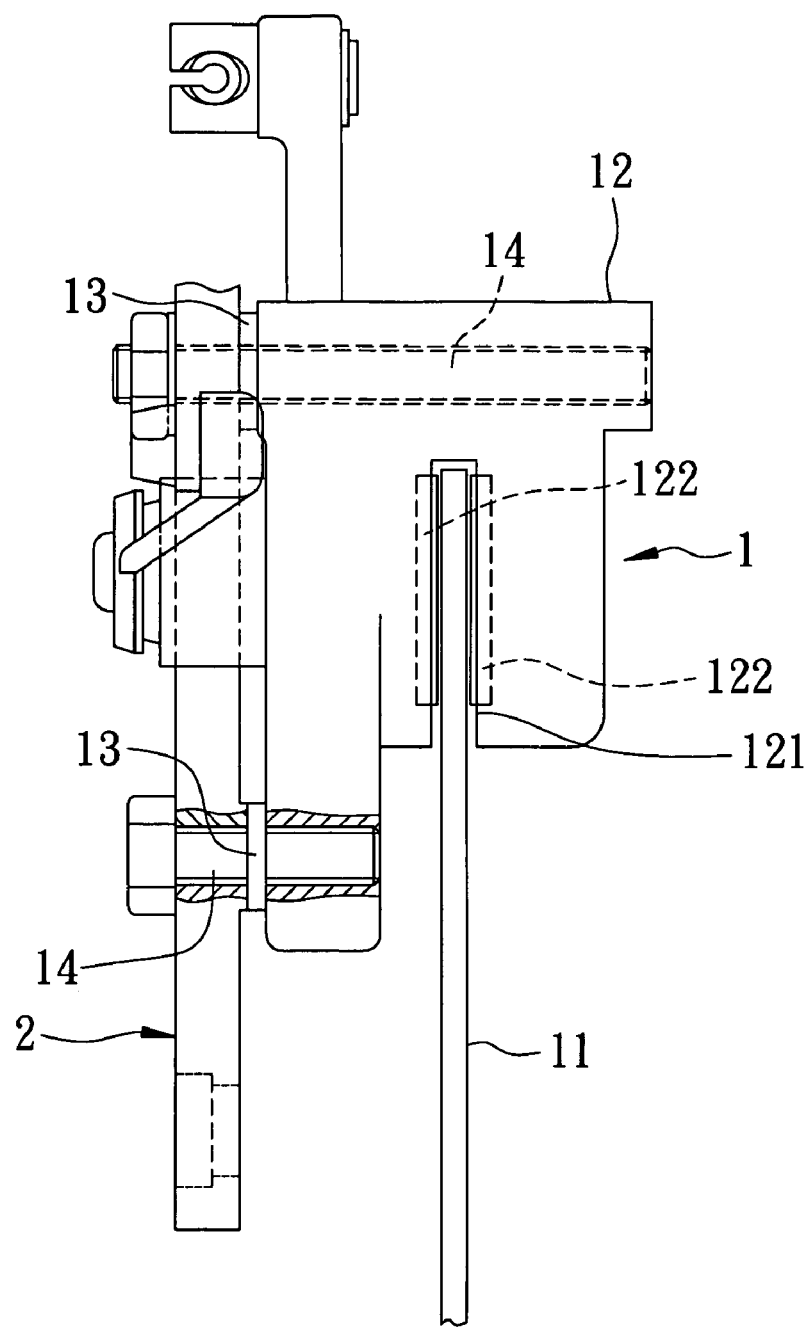
FIG. 1 is a partially sectioned schematic view of a conventional bicycle disk brake device.
Figure 2:
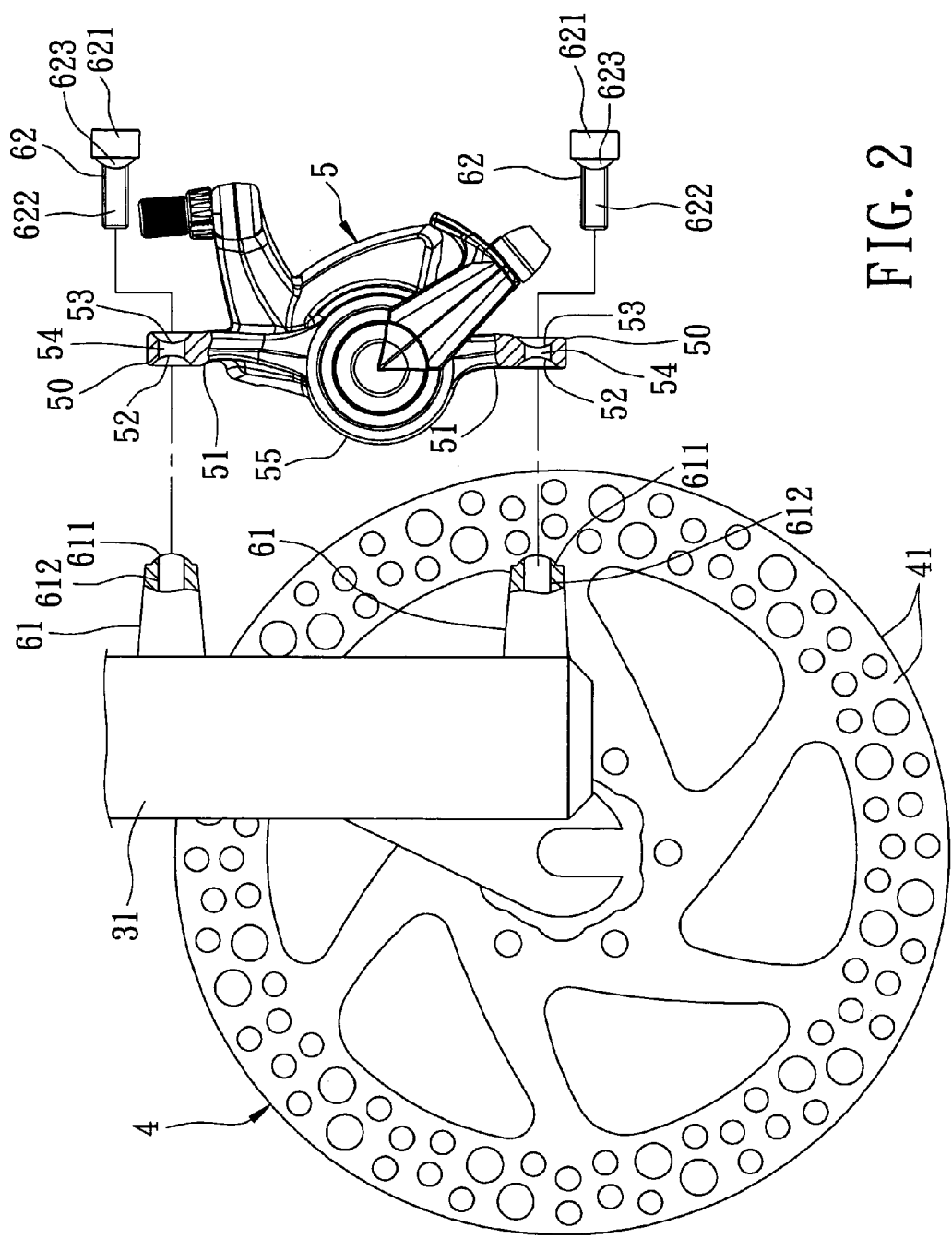
FIG. 2 is a partially sectioned exploded view of the preferred embodiment of a bicycle disk brake device according to this invention.
Figure 3:
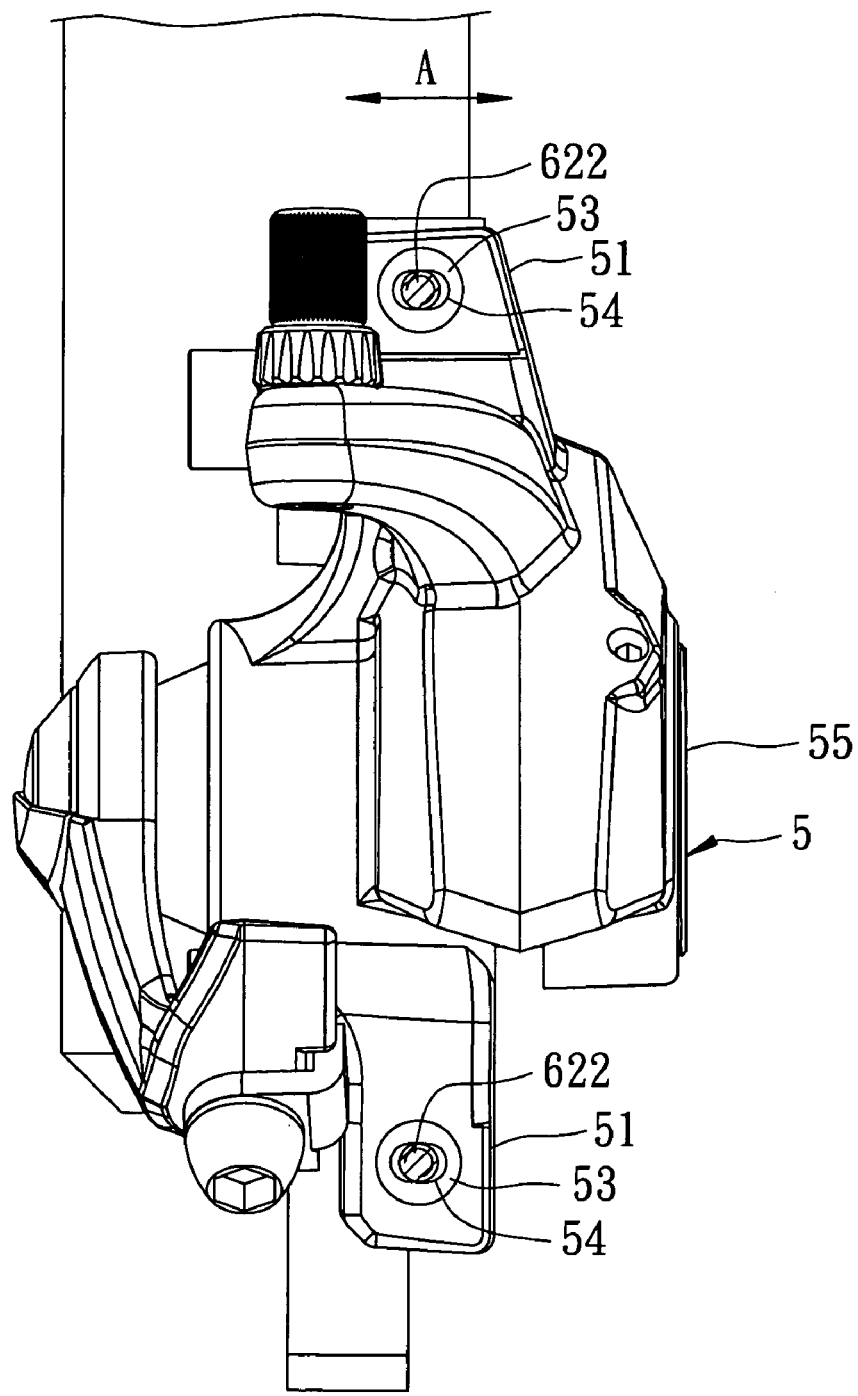
FIG. 3 is a partially sectioned perspective view of the preferred embodiment.

Referring to FIGS. 2 and 3, the preferred embodiment of a bicycle disk brake device according to the present invention is shown to comprise a brake disk 4, a caliper 5, two joints 50, and two tightening members 62.

The brake disk 4 is adapted to be mounted to a bicycle fork frame 31, is coaxial with a bicycle wheel (not shown) in a longitudinal direction, and has left and right wall surfaces 41 opposite to each other in the longitudinal direction. Two anchored members 61 are adapted to be mounted to the bicycle fork frame 31, and are spaced apart from one of the left and right wall surfaces 41 of the brake disk 4 in the longitudinal direction. Each of the anchored members 61 extends in a transverse direction relative to the longitudinal direction, terminates at a convex-shaped coupling wall 611 that faces forward in the transverse direction, and has a tightening hole 612 extending from the coupling wall 611 in the transverse direction.

The caliper 5 includes a base 55 which defines a centerline normal to the base 55 and oriented in the longitudinal direction, two brake linings 7 (see FIG. 5) which are mounted on the base 55 and which are spaced apart from the left and right wall surfaces 41, respectively, by predetermined clearances, and two arms 51 which extend from the base 55 in a radial direction relative to the centerline to terminate at arm ends.

Each of the joints 50 is integrally formed with the arm end of the respective arm 51, and has a concave-shaped compliant wall 52 which is configured to be compliantly mated with the coupling wall 611 of the respective anchored member 61 such that, in a slightly loosened position, the compliant wall 52 is permitted to angularly displace relative to the coupling wall 611 so as to adjust the position of the brake linings 7 relative to the brake disk 4, thereby maintaining the predetermined clearances between the brake linings 7 and the brake disk 4, and such that, in a tightened position, the compliant wall 52 is prevented from moving relative to the coupling wall 611, a concave-shaped abutted wall 53 opposite to the compliant wall 52, and a through hole 54 which extends from the abutted wall 53 through the compliant wall 52 and which is in alignment with the tightening hole 612 in the respective anchored member 61.

Each of the tightening members 62 includes a shank 622 which is configured to pass through the through hole 54 in the respective joint 50 and to be threadedly engaged with the tightening hole 612 so as to be loosely held in the tightening hole 612 when the respective joint 50 is in the slightly loosened position to get ready for subsequent tightening, and a head 621 which is connected to the shank 622 and which has a convex-shaped abutting wall 623 that is compliantly mated with the abutted wall 53 of the respective joint 50 when the shank 622 is threadedly engaged with the tightening hole 612 so as to firmly secure the compliant wall 52 of the respective joint 50 in the tightened position. It is noted that each of the coupling wall 611 and the abutting wall 623 may be of a concave shape, and each of the compliant wall 52 and the abutted wall 53 may be of a convex shape.

Figure 4:
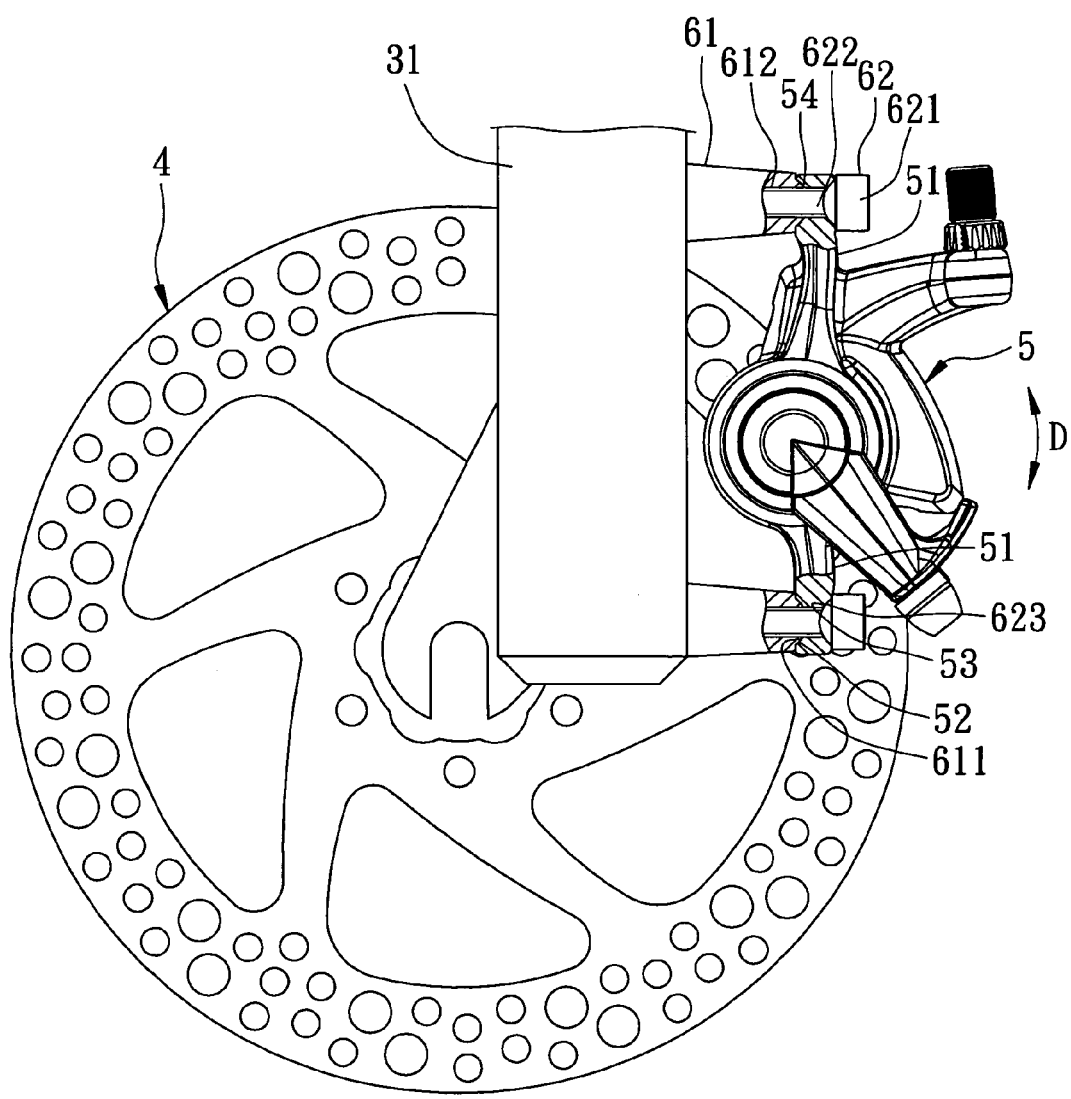
FIG. 4 is a partially sectioned schematic view of the preferred embodiment taken from another angle.
Figure 5:
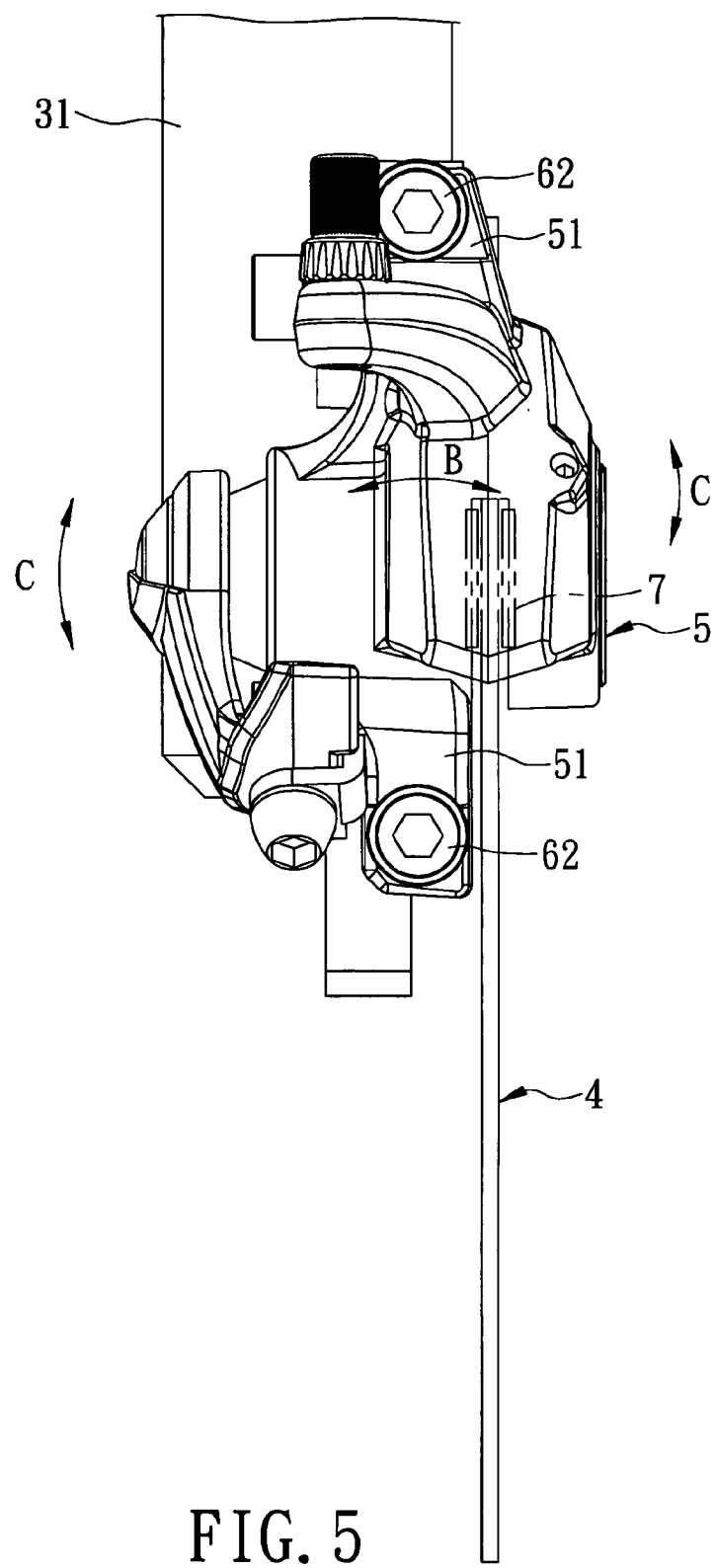
FIG. 5 is a perspective view of the preferred embodiment taken from another angle.

As illustrated, referring to FIGS. 3 to 5, when it is desired to adjust the position of the brake linings 7 relative to the brake disk 4, the tightening members 62 are loosened so as to permit the compliant walls 52 of the joints 50 to displace to the slightly loosened position. Thus, the joints 50 can be moved relative to the anchored members 61 along the through holes 54 in a direction (A) shown in FIG. 3, or in any direction (B), (C) or (D) shown in FIGS. 4 and 5 so that the caliper 5 can be disposed at a desired position relative to the fork frame 31 to thereby maintain appropriate clearances between the brake linings 7 and the brake disk 4. After the adjustment is completed, the tightening members 62 are tightened to secure the compliant walls 52 in the tightened position, with the abutted walls 53 of the joints 50 being abutted against by the abutting walls 623 of the tightening members 62. Since the caliper 5 does not have to be detached from the anchored members 61 during the adjustment, and due to the compliant mating of the coupling walls 611 and the compliant walls 52, the position of the caliper 5 can be adjusted conveniently and precisely.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A bicycle disk brake device comprising:

a brake disk which is adapted to be mounted to a bicycle frame and coaxial with a bicycle wheel in a longitudinal direction, and which has left and right wall surfaces opposite to each other in the longitudinal direction;

at least one anchored member which is adapted to be mounted to the bicycle frame, and which is spaced apart from one of said left and right wall surfaces in the longitudinal direction, said anchored member extending in a transverse direction relative to the longitudinal direction and terminating at a coupling wall that faces forward in the transverse direction, said anchored member having a tightening hole that extends from said coupling wall in the transverse direction;

a caliper including a base which defines a centerline normal to said base and oriented in the longitudinal direction, two brake linings which are mounted on said base and which are spaced apart from said left and right wall surfaces, respectively, by predetermined clearances, and at least one arm which extends from said base in a radial direction relative to the centerline to terminate at an arm end;

at least one joint which is connected to said arm end and which has a compliant wall that is configured in a convex-and-concave relationship with said coupling wall so as to mate compliantly with said coupling wall such that, in a slightly loosened position, said compliant wall is permitted to angularly displace relative to said coupling wall so as to adjust a position of said brake linings relative to said brake disk, thereby maintaining the predetermined clearances, and such that, in a tightened position, said compliant wall is prevented from moving relative to said coupling wall, said joint having an abutted wall opposite to said compliant wall, and a through hole which extends from said abutted wall through said compliant wall and which is aligned with said tightening hole when said compliant wall mates with said coupling wall; and at least one tightening member disposed to displace said compliant wall from the slightly loosened position to the tightened position, said tightening member including a shank which is configured to pass through said through hole and to be loosely held in said tightening hole when said joint is in the slightly loosened position, said shank being threadedly engaged with said tightening hole, said tightening member further including a head which is connected to said shank and which has an abutting wall that mates compliantly with said abutted wall when said shank is threadedly engaged with said tightening hole so as to secure said compliant wall in the tightened position.

2. The bicycle disk brake device of claim 1, wherein each of said coupling wall and said abutting wall is of a convex shape, and each of said compliant wall and said abutted wall is of a concave shape.

3. The bicycle disk brake device of claim 1, wherein said joint is integrally formed with said arm end.

* * * * *